J. C. DE LANEY.
SHAFT COUPLING.
APPLICATION FILED APR. 22, 1915.

1,197,802.

Patented Sept. 12, 1916.

Witness
Franklin E. Low

Inventor:
John C. De Laney
By his attorney, Charles V. Gooding

UNITED STATES PATENT OFFICE.

JOHN C. DE LANEY, OF WATERTOWN, MASSACHUSETTS.

SHAFT-COUPLING.

1,197,802.  Specification of Letters Patent.  Patented Sept. 12, 1916.

Application filed April 22, 1915. Serial No. 23,228.

*To all whom it may concern:*

Be it known that I, JOHN C. DE LANEY, a citizen of the United States, residing at Watertown, in the county of Middlesex and State of Massachusetts, have invented new and useful Improvements in Shaft-Couplings, of which the following is a specification.

This invention relates to shaft couplings especially, though not essentially, constructed for use in connection with molding machines of the type disclosed in the U. S. Letters Patent No. 1,056,889, issued to me March 25, 1913. This type of machine embraces a driving shaft and a driven shaft or arbor upon which the cutting heads, molding heads, saws or the like may be mounted.

The object of this invention is to provide a simple, powerful, quickly and easily operated clutch or coupling for operatively connecting together the driving and driven members or shafts hereinbefore referred to. This coupling is constructed and arranged to be operated, when the driving member is either in operation or stationary, to connect the driven member therewith or to disconnect said driven member from said driving member.

A further object of this invention is to provide a coupling which is so constructed and arranged that the driven member thereof, when disconnected from said driving member, may be moved transversely relatively to the longitudinal axis of said driving member into a position where free access may be had to said driven member for the purpose of removing or replacing the cutting or moving heads, saws or the like without interrupting the operations of said driving member or other parts of the machine.

Still another object of this invention is to provide means constructed and arranged to compensate for any variations between the axis of the driving member and that of said driven member.

The invention consists in the combination and arrangement of parts whereby the above objects and certain other objects hereinafter appearing may be attained, as set forth in the following specification and particularly pointed out in the claims.

Figure 1:
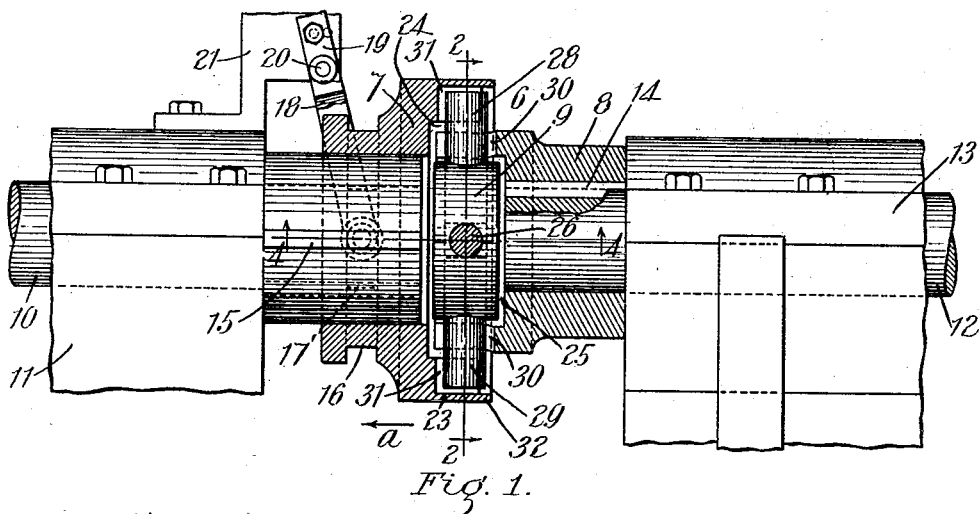
Figure 2:
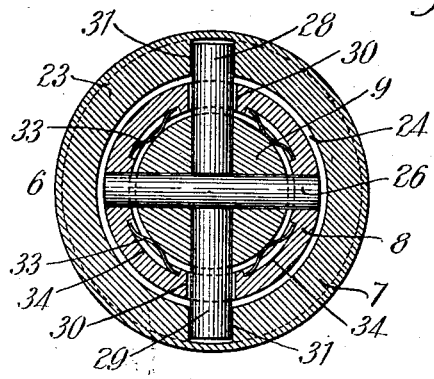
Figure 3:
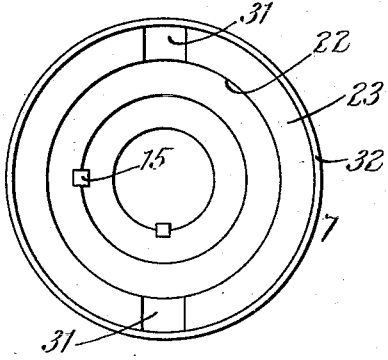
Figure 4:
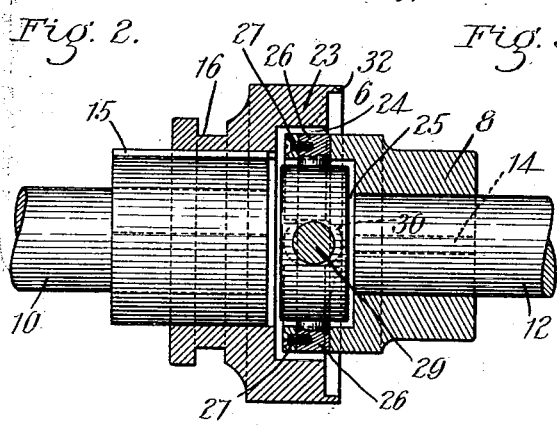

Referring to the drawings, Figure 1 is a longitudinal section, partly in elevation, of a coupling embodying my invention, with portions of the bearings of the driving and driven members shown broken away to save space in the drawings. Fig. 2 is a section taken on the line 2—2 of Fig. 1. Fig. 3 is an end elevation of the driving member of said coupling. Fig. 4 is a longitudinal section, partly in elevation, taken on the line 4—4 of Fig. 1.

Like numerals refer to like parts throughout the several views of the drawings.

In the drawings, 6 is a coupling consisting of a driving member 7 and a driven member 8 arranged in close proximity to said driving member and operatively connected therewith preferably by means of a floating member or pivot block 9 interposed between said driving and driven members and universally movable relatively thereto. In the present construction the driving member 7 is attached to a shaft 10, which is the driving shaft of the machine, and is journaled to rotate in a bearing 11. The driven member 8 is attached to a driven shaft or arbor 12 journaled to rotate in a bearing 13. The shafts 10 and 12 are normally adapted to aline with each other.

One of the important features of this invention is to provide a coupling having coupling sections which may be connected or disconnected during the operation of the driving shaft. To accomplish this result in what I believe to be the most practical and desirable manner, the driven member 8 is secured upon the driven shaft 12 to rotate therewith preferably by means of a key 14. The driving member 7 is slidably arranged to move longitudinally of said shaft toward and from the driven member 8 and is rotated with said shaft by means of a key 15.

The driving member 7 is provided with an annular groove 16 adapted to receive suitably constructed blocks 17 disposed substantially diametrically opposite each other and pivotally mounted in the ends of the arms 18 of a forked lever 19. The lever 19 is pivoted at 20 preferably to a bracket 21 mounted upon the bearing 10, said lever being arranged and constructed to reciprocate the driving member 7 on said shaft to connect and disconnect said coupling members.

The floating member 9, by means of which the coupling sections 7 and 8 are operatively connected together, is preferably arranged to rock about a pair of pivots. The axes of said pair of pivots are arranged in a common plane extending transversely of the longitudinal axes of the shafts 10 and 12, or of the members 7 and 8. These pivots are arranged substantially at right angles to each other and one of them engages the member 7, while the other of said pivots engages the member 8.

In the carrying out of this feature of the invention the members 7 and 8 are preferably telescopically arranged, the member 8 being substantially smaller in diameter and projecting into a recess 22 formed in the member 7, which recess forms an annular flange 23 upon the member 7. An annular space 24 is provided between the member 8 and the portion of the member 7 which projects over said member 8.

The coupling member 8 is provided with a recess 25 in its end adjacent the coupling member 7 within which recess the floating member 9 is arranged. The floating member 9 is smaller in diameter than the recess 25 and is thereby permitted to be moved substantially in all directions transversely of the longitudinal axes of the shafts 10 and 12.

One of the pivots hereinbefore referred to is in the form of a pin 26 extending transversely of the pivot block 9 in rotatable and slidable engagement therewith, opposite ends of said pin extending into the portion of the driven member 8 which surrounds said floating member. Screws 27, 27 are provided in said driven member for the purpose of permanently securing said pin stationary in said driven member.

The other pivot for said floating member 9 is preferably embodied in a pair of pins 28 and 29 having a common longitudinal axis arranged substantially at right angles to the longitudinal axis of the pin 26 and lying substantially in the same transverse plane which contains the axis of said pin 26.

The pins 28 and 29 protrude from the block 9 in opposite directions through enlarged openings 30, 30 in the surrounding portion of the driven member 8 and into recesses 31, 31 provided in the annular flange 23 of the driving member 7. The recesses 31 open outwardly to the end of the flange 23 and permit the portions of said pins 28 and 29, which occupy said recesses to be connected and disconnected from said driven member.

A rim 32 extends circumferentially of the outer portion of the annular flange 23 and in the direction of the longitudinal axis of the driving member and is for the purpose of controlling or limiting the longitudinal movements of the pins 28 and 29 transversely relatively to the axes of the shafts 10 and 12. The pins 28 and 29 terminate at a distance within said rim 32 in order to permit a limited longitudinal movement of said pins. This movement together with the sliding movement of said pivot block 9 upon the pin 26 coöperates to permit said pivot block to float about within the recess 22 and thus compensate, when necessary, for any variations between the longitudinal axis of the shaft 10 and that of the shaft 12, that is to say, providing said shafts are not in proper alinement with each other.

When the pins 26, 28 and 29 become somewhat worn or should they be loosely mounted in the floating member 9 and the driven member 8, said floating member will drop against the lower side of the member 8 and thus hinder the connecting of the pins 28 and 29 with the driving member 7, at least when the driving and driven members are inoperative.

To provide against such a difficulty a plurality of springs, preferably flat springs 33, 33, are arranged between the floating member 9 and the surrounding flange of the driven member 8 and yieldingly engage both said members, thus yieldingly retaining said floating member central relatively to said driven member, but permitting said driven member to be moved transversely within said driving member when necessity demands it. Recesses 34 are provided preferably in the surrounding flange of the driven member 8 to receive and position said springs, permitting said springs to be depressed until flush with the inner face or periphery of said driven member.

To operate the coupling to disconnect the driving and driven members from each other, the lever 19 must be rocked upon its pivot 20 to withdraw the member 7, in the direction of the arrow "$a$", from engagement with the ends of the pins 28 and 29 and until the outer end of the rim 32 is entirely free from the end of the coupling section 8. This leaves the driven member 8 and its shaft 12 free to be swung transversely of the longitudinal axis of the driving shaft or entirely removed from the machine, if it is desired. A reverse movement of the lever 19 moves the driving member 7 of said coupling toward the driven member 8 until the extremities of the pins 28 and 29 engage the end of the annular flange 23. Should the driving shaft 10 be rotating at this time the driving member 7 of said coupling will continue to rotate relatively to the driving member 8 and with said pins in contact with the end of the flange 23 until the recesses 31 are moved into a position to aline with the ends of said pins, whereupon a slight pressure upon the lever 19 causes said pins to enter said recesses and thus lock the driving and driven members in operative relation to each other.

Having thus described my invention what I claim and desire by Letters Patent to secure is:

1. A shaft coupling having, in combination, a pair of coupling members arranged with their longitudinal axes substantially in alinement, with one of said coupling members having longitudinal movement with respect to the other, a floating member interposed between said coupling members, means for pivotally connecting said floating member with one of said coupling members, and means for detachably connecting said floating member with the other of said coupling members, said detachable connecting means being constructed and arranged to be disconnected from said latter coupling member by a longitudinal movement of said movable coupling member, said floating member and its connecting means being adapted to permit the longitudinal axes of said coupling members to be moved out of alinement with each other when said coupling members are connected together.

2. A shaft coupling having, in combination, a pair of coupling members one of which is movable toward and from the other, a floating member interposed between said coupling members, and means for connecting the members of said coupling respectively with said floating member, said means coöperating with said floating member to permit a universal movement of one of said coupling members with respect to the other.

3. A shaft coupling having, in combination, a driving member, a driven member, one of said members having longitudinal movement toward and away from the other, a floating member interposed between said driving and driven members, means for detachably connecting said movable coupling member with said floating member adapted to be disengaged by a movement of said coupling member away from said floating member, and means for pivotally connecting said floating member with the other member.

4. A shaft coupling having, in combination, a pair of coupling members, one of which is movable toward and from the other, a floating member, means for detachably pivotally connecting said floating member with the movable member of said pair adapted to be detached therefrom by the movement of said coupling member away from the other coupling member, means to permanently pivotally connect said floating member with the other member of said pair, and means constructed and arranged to move said movable member toward and away from said floating member, whereby said coupling members may be operatively connected or disconnected.

5. A shaft coupling having, in combination, a driving shaft, a coupling member slidably arranged on said shaft and adapted to rotate therewith, a driven shaft arranged substantially in alinement with said driving shaft, a coupling member secured to said driven shaft, a movable member interposed between said coupling members, means for operatively connecting said movable member with the coupling member on said driven shaft, and means carried by said movable member adapted to detachably connect said movable member with said slidable coupling member and constructed and arranged to be disengaged therefrom by the movement of said slidable coupling member away from the other coupling member, said operatively connecting means and said detachably connecting means being constructed and arranged to coöperate with said movable member to substantially permit a universal movement between said coupling members.

6. A shaft coupling having, in combination, a pair of coupling members, one of which is slidably arranged relatively to the other, a pivot block interposed between said coupling members, and a pair of pivots adapted to operatively connect said pivot block with said coupling members respectively, one of said pivots being detachably connected with one of said coupling members and constructed and arranged to be detached therefrom during the movement of said sliding coupling member away from the other coupling member, the axes of said pair of pivots being arranged substantially at right angles to each other and in a plane extending transversely of the longitudinal axes of said coupling members.

7. A shaft coupling having, in combination, a pair of coupling members, one of which is slidably arranged with respect to the other, a pivot block arranged intermediate of said coupling members, a pin mounted in said pivot block transversely of the longitudinal axes of said coupling members, said pin being detachably connected with said slidable coupling member and adapted to be detached therefrom during the movements of said coupling member in one direction relatively to the other coupling member, and a second pin mounted in said pivot block secured to the other coupling member, said second pin being disposed transversely of the longitudinal axes of said coupling members and substantially at right angles to said other pin.

8. A shaft coupling having, in combination, a pair of coupling members, one of which is slidable toward and away from the other, a floating member interposed between said coupling members, a pin secured to one of said coupling members with its longitudinal axis extending transversely of the axes of said coupling members, said pin having slidable and pivotal engagement with said floating member, and a second pin arranged in said floating member with its longitudinal axis disposed substantially at right angles to the axis of said first mentioned pivot, said second named pin being adapted to pivotally and slidably engage the other coupling member, said second named pin also having detachable engagement with said last mentioned coupling member and adapted to be detached therefrom during the sliding movements of said slidable coupling member away from the other coupling member.

9. A shaft coupling having, in combination, a pair of telescopically arranged coupling members having recesses in their adjacent ends, a pivot block arranged in the recess of one of said members, a pin secured in said last mentioned member transversely of the longitudinal axes of said coupling members, said pin having pivotal and slidable engagement with said pivot block, a pair of pins arranged with their longitudinal axes in alinement, and disposed substantially at right angles to the longitudinal axis of said first named pin, said pins also being arranged substantially at right angles to the longitudinal axes of said coupling members and in detachable and pivotal engagement with the other of said coupling members, and means constructed and arranged to move said last named coupling member relatively to the other of said coupling members toward and from said pair of pins for the purpose of connecting and disconnecting said coupling members.

10. A shaft coupling having, in combination, a driving member, a driven member, a floating member interposed between and having pivotal engagement with said driving and driven members respectively, and means to yieldingly retain said floating member central relatively to said driving and driven members.

11. A shaft coupling having, in combination, a driving member, a driven member, said driving member being slidably arranged with respect to said driven member, a floating member interposed between said driving and driven members, means for connecting said floating member with said driven member constructed and arranged to permit a pivotal sliding movement therebetween, means for connecting said floating member with said driving member adapted to permit a sliding pivotal movement of said floating member relatively to said driving member, said means also being detachably connected with said driving member adapted to be detached from said floating member by the sliding movements of said driving member in one direction, and a series of springs adapted to normally retain said floating member central relatively to said driving and driven members.

In testimony whereof I have hereunto set my hand in presence of two subscribing witnesses.

JOHN C. DE LANEY.

Witnesses:
CHARLES T. GOODING,
SYDNEY E. TAFT.

Copies of this patent may be obtained for five cents each, by addressing the "Commissioner of Patents, Washington, D. C."